United States Patent
Kim et al.

(10) Patent No.: US 8,663,469 B2
(45) Date of Patent: Mar. 4, 2014

(54) STRAINER WALL STRUCTURE INCLUDING CURVED SECTIONS

(75) Inventors: Sang Yeol Kim, Daejeon (KR); Hyeong Teak Kim, Daejeon (KR); Chang Hyun Kim, Daejeon (KR); Sang Won Lee, Daejeon (KR); Jong In Woo, Gyeongsangnam-do (KR)

(73) Assignees: Korea Hydro & Nuclear Power Co., Ltd., Seoul (KR); BHI Co., Ltd., Gyeongsangnam-do (KR)

( * ) Notice: Subject to any disclaimer, the term of this patent is extended or adjusted under 35 U.S.C. 154(b) by 512 days.

(21) Appl. No.: 12/875,182

(22) Filed: Sep. 3, 2010

(65) Prior Publication Data

US 2012/0037572 A1  Feb. 16, 2012

(30) Foreign Application Priority Data

Aug. 12, 2010 (KR) .................. 10-2010-0077639

(51) Int. Cl.
    *B01D 35/02*  (2006.01)
    *B01D 35/28*  (2006.01)
    *B01D 29/00*  (2006.01)

(52) U.S. Cl.
    USPC .............. 210/232; 210/167.01; 210/172.3; 210/172.4; 210/499; 210/416.1; 210/489; 210/346; 210/486; 376/282; 376/313

(58) Field of Classification Search
    None
    See application file for complete search history.

(56) References Cited

U.S. PATENT DOCUMENTS

| | | | | |
|---|---|---|---|---|
| 4,225,328 A * | 9/1980 | Stiehl | .............. | 55/378 |
| 4,376,091 A * | 3/1983 | Netkowicz et al. | .......... | 376/283 |
| 4,446,099 A * | 5/1984 | Schwind et al. | .............. | 376/277 |
| 4,543,188 A * | 9/1985 | Okouchi et al. | .............. | 210/304 |
| 5,080,699 A * | 1/1992 | Ho et al. | ......................... | 96/129 |
| 5,243,632 A * | 9/1993 | Badin et al. | ................... | 376/313 |
| 5,345,483 A * | 9/1994 | Johansson et al. | ............ | 376/313 |
| 5,390,221 A * | 2/1995 | Dix et al. | ...................... | 376/352 |
| 5,426,679 A * | 6/1995 | Henriksson | ................... | 376/313 |
| 5,453,180 A * | 9/1995 | Henriksson | ............. | 210/167.01 |
| 5,478,469 A * | 12/1995 | Bryan et al. | ................... | 210/232 |
| 5,483,564 A * | 1/1996 | Matzner et al. | ............... | 376/352 |
| 5,539,790 A * | 7/1996 | Henriksson | ................... | 376/313 |
| 5,688,402 A * | 11/1997 | Green et al. | ................... | 210/355 |
| 5,696,801 A * | 12/1997 | Dwyer et al. | ................. | 376/313 |
| 5,705,054 A * | 1/1998 | Hyrsky | ......................... | 210/109 |
| 5,759,398 A * | 6/1998 | Kielbowicz | ................ | 210/416.1 |
| 5,759,399 A * | 6/1998 | Bilanin et al. | ............. | 210/416.1 |
| 5,815,544 A * | 9/1998 | Lefter | ........................... | 376/313 |
| 5,835,549 A * | 11/1998 | Sibiga | .......................... | 376/313 |
| 5,843,314 A * | 12/1998 | Dwyer et al. | ................. | 210/315 |
| 5,935,439 A * | 8/1999 | Hart et al. | .................. | 210/416.1 |

(Continued)

*Primary Examiner* — Robert James Popovics
(74) *Attorney, Agent, or Firm* — Leydig, Voit & Mayer, Ltd.

(57) ABSTRACT

A strainer wall structure includes curved sections, a method of manufacturing the same, and a filtering method using the strainer wall structure to provide a substantially larger effective filtering area in the same length and width, substantially reducing foreign substances covering a suction surface and flow resistance of the foreign substances, and reducing pressure drop at a cooling water pass corresponding thereto. The strainer wall structure includes an inlet side through which cooling water is introduced and an outlet side through which the filtered cooling water is discharged, includes a body having openings in directions of the inlet side and the outlet side, and a first filter plate inserted into the body and including curved sections formed by alternately bending a first punched plate having filtering holes in opposite directions and at a predetermined interval.

5 Claims, 7 Drawing Sheets

(56) References Cited

U.S. PATENT DOCUMENTS

| | | | |
|---|---|---|---|
| 5,958,234 A * | 9/1999 | Dwyer et al. | 210/315 |
| 6,477,220 B1 * | 11/2002 | Wivagg | 376/282 |
| 6,491,818 B2 * | 12/2002 | Dwyer et al. | 210/315 |
| 7,211,190 B2 * | 5/2007 | Kielbowicz | 210/232 |
| 7,258,238 B2 * | 8/2007 | Raghupathy | 210/411 |
| 7,488,426 B1 * | 2/2009 | Zaiter | 210/767 |
| 7,788,867 B2 * | 9/2010 | Oates et al. | 52/302.1 |
| 7,822,164 B1 * | 10/2010 | Kielbowicz | 376/313 |
| 7,848,475 B2 * | 12/2010 | Kaufman et al. | 376/282 |
| 8,048,319 B2 * | 11/2011 | Smith et al. | 210/767 |
| 8,054,932 B2 * | 11/2011 | Smith et al. | 376/282 |
| 8,475,659 B2 * | 7/2013 | Oh et al. | 210/232 |
| 2002/0148766 A1 * | 10/2002 | Dwyer et al. | 210/315 |
| 2003/0196950 A1 * | 10/2003 | Kraft | 210/322 |
| 2004/0206679 A1 * | 10/2004 | Bleigh | 210/97 |
| 2005/0082209 A1 * | 4/2005 | Raghupathy | 210/107 |
| 2005/0167355 A1 * | 8/2005 | Kielbowicz | 210/416.1 |
| 2006/0075697 A1 * | 4/2006 | Oates et al. | 52/177 |
| 2006/0219645 A1 * | 10/2006 | Bilanin et al. | 210/791 |
| 2007/0045166 A1 * | 3/2007 | Fanning et al. | 210/330 |
| 2007/0084782 A1 * | 4/2007 | Smith et al. | 210/323.2 |
| 2008/0156712 A1 * | 7/2008 | Rhodes et al. | 210/137 |
| 2008/0223779 A1 * | 9/2008 | Kaufman et al. | 210/416.1 |
| 2009/0184064 A1 * | 7/2009 | Zaiter | 210/767 |
| 2010/0025315 A1 * | 2/2010 | Smith et al. | 210/232 |
| 2011/0084008 A1 * | 4/2011 | Kielbowicz et al. | 210/137 |
| 2011/0215059 A1 * | 9/2011 | Smith et al. | 210/806 |
| 2011/0297627 A1 * | 12/2011 | Oh et al. | 210/806 |
| 2012/0037559 A1 * | 2/2012 | Kim et al. | 210/323.2 |
| 2012/0037572 A1 * | 2/2012 | Kim et al. | 210/767 |
| 2012/0273407 A1 * | 11/2012 | Haque et al. | 210/335 |

* cited by examiner

STRAINER WALL STRUCTURE INCLUDING CURVED SECTIONS

TECHNICAL FIELD

The present invention relates to a strainer wall structure (referred to as a passive filtering apparatus) for filtering foreign substances, settlings, etc., generated upon occurrence of failures or accidents of an apparatus requiring a water circulation system, and more particularly, to a strainer wall structure including a plurality of curved sections, a method of manufacturing the same, and a filtering method using the same, that are used to remove foreign substances from a fluid suctioned into a pipe and a re-circulation pump when the re-circulation pump goes through an operation of an emergency core cooling system (ECCS) when a pipe failure occurs in a nuclear power plant.

BACKGROUND ART

A nuclear reactor of a nuclear power plant is surrounded by a safety vessel formed of concrete and steel, which is referred to as a containment, in which a coolant circulates to maintain a proper temperature. In addition, the nuclear reactor includes an ECCS for cooling the nuclear reactor upon occurrence of failures or accidents.

The ECCS must be operated upon occurrence of accidents such as coolant leakage, etc., to cool the nuclear reactor for 30 days with no external interference.

The ECCS is a system for collecting coolant discharged and water sprinkled upon a pipe failure into a sump disposed at the lowermost part in the containment, sprinkling the water from an upper part of the containment using the re-circulation pump to cool the containment, and circulating some of the water through a nuclear reactor cooling system to remove remaining heat of the nuclear reactor using a remaining heat removing pump.

When coolant leakage occurs due to damage to a pipe, etc., in a primary system of the nuclear power plant, foreign substances such as lagging materials, coating materials, latent foreign substances, etc., are generated due to discharge of a coolant. In addition, the discharged coolant and water sprinkled from a sprinkler system of the containment move all foreign substances to a re-circulation sump disposed at a lower end of the containment of the nuclear reactor. Therefore, in order for the foreign substances not to decrease performance of the ECCS, a filtering apparatus is provided in front of an introduction part of a suction pipe guided to an emergency cooling pump.

When a high temperature and high pressure pipe is broken, foreign substances such as fragments of lagging materials, coating materials, etc., are generated and moved toward the sump, and the filtering apparatus functions to filter the foreign substances moved to the sump and supply the filtered water into the re-circulation pump, without interfering with the operation of the re-circulation pump.

The filtering apparatus ensures that the foreign substances generated due to accidents can be filtered and the water can appropriately pass therethrough. In this case, a pressure drop due to the foreign substances must be guaranteed not to exceed an allowable critical value.

A conventional filter screen used in a pressurized water reactor type nuclear power plant has a small screen surface only, and the screen surface is mainly formed of flat grid segments. Thus, when the screen surface is contaminated with fiber settlings, a pressure drop at the screen may be largely increased to an unallowable level.

However, the filtering apparatus having a single surface may be easily deformed by a high pressure, and a small effective filtering area per a unit volume may decrease filtering efficiency. In order to solve the problem, while the number of filtering apparatus may be increased, their installation cost is high, which causes economical problems. Therefore, a filtering apparatus capable of increasing a filtering area per unit volume is still needed.

SUMMARY OF THE INVENTION

In order to solve the foregoing and/or other problems, it is an aspect of the present invention to provide a strainer wall structure including a plurality of curved sections, a method of manufacturing the same, and a filtering method using the same that are capable of providing a substantially larger effective filtering area in the same length and width, substantially reducing foreign substances covering a suction surface and a flow resistance of the foreign substances, and reducing a pressure drop at a cooling water pass corresponding thereto.

It is another aspect of the present invention to provide a strainer wall structure including a plurality of curved sections, a method of manufacturing the same, and a filtering method using the same in which manufacturing and installation costs can be reduced to solve economical problems in exchange and installation thereof.

The foregoing and/or other aspects of the present invention may be achieved by providing a strainer wall structure including an inlet side through which cooling water is introduced and an outlet side through which the filtered cooling water is discharged, including a body having openings in directions of the inlet side and the outlet side; and a first filter plate inserted into the body and including a plurality of curved sections formed by alternately bending a first punched plate having a plurality of filtering holes in opposite directions at predetermined intervals.

The first filter plate may include the curved sections convex toward the inlet side and the curved sections convex toward the outlet side, which are alternately bent in a zigzag shape in opposite directions at predetermined intervals, and introduction spaces into which the cooling water is introduced and discharge spaces through which the cooling water is discharged, which are alternately disposed.

The first filter plate may be provided in plural.

The strainer wall structure may further include second filter plates coupled between the first filter plates and formed by bending a second punched plate having a plurality of filtering holes in a two-stage shape.

A space surrounded by the first filter plates and the second filter plates forms a suction pocket into which the cooling water is introduced and a discharge pocket through which the cooling water is discharged.

The second filter plate may have a dual wall structure to form a discharge cam therein.

When the cooling water is suctioned into the suction pocket, the cooling water may be surrounded by five surfaces.

The filtering holes may have a diameter of 1 to 3 mm.

The body may include closed surfaces disposed at side surfaces, an upper plate assembled to an upper part, and a lower plate assembled to a lower part.

The upper plate may include projections to be press-fitted to upper ends of the second filter plates and assembled to an upper part, and the lower plate may include projections to be press-fitted to lower ends of the second filter plates and assembled to a lower part.

The strainer wall structure may further include coupling members for coupling the upper plate and the lower plate to the closed surfaces to fix the first filter plates and the second filter plates into the body.

Another aspect of the present invention may be accomplished by providing a method of manufacturing a strainer wall structure, including forming a first punched plate having a predetermined width and a predetermined length and including a plurality of filtering holes, and alternately bending the first punched plate in opposite directions at predetermined intervals to form a first filter plate having a plurality of curved sections; inserting the first filter plate into a body including openings in directions of an inlet side and an outlet side of cooling water; and fixing the first filter plate into the body using coupling members.

In forming the first filter plate, bending the first filter plate in 180° opposite directions at predetermined intervals to alternately form the curved sections convex toward the inlet side and the curved sections convex toward the outlet side; and, in inserting the first filter plate, the first filter plate is inserted into the body such that introduction spaces into which the cooling water is introduced and discharge spaces through which the cooling water is discharged are alternately disposed.

The method may further include, in forming the first filter plate, forming a plurality of first filter plates; simultaneously with forming the first filter plate or before or after forming the first filter plate, bending a second punched plate having a plurality of filtering holes in a two-stage shape to form a second filter plate having a dual wall structure including a discharge cam formed therein; and coupling the second filter plate between the plurality of first filter plates, in inserting the first filter plate, inserting the first filter plates and the second filter plate, which are coupled to each other, and in fixing the first filter plate, fixing the inserted first filter plates and second filter plate into the body.

Fixing the first and second filter plates may further include coupling closed surfaces to side surfaces of the first filter plates coupled to the second filter plates, press-fitting the upper plate to upper ends of the second filter plates to assemble the upper plate to an upper part, and press-fitting the lower plate to lower ends of the second filter plates to assemble the lower plate to a lower part; and coupling the upper plate and the lower plate to the closed surfaces using the coupling members to fix the first filter plates and the second filter plates into the body.

Another aspect of the present invention may be accomplished by providing a cooling water filtering method using a strainer wall structure, including installing the strainer wall structure at a passage through which cooling water flows; introducing the cooling water into an inlet side; introducing the cooling water into a suction pocket of a first filter plate, contacting the cooling water with curved sections convex toward the inlet side, and contacting the cooling water with a bent surface of the second filter plate; and filtering the cooling water through a punched surface of the first filter plate and a dual wall of the second filter plate to discharge the cooling water to an outlet side.

In contacting the cooling water, the cooling water introduced into the suction pocket of the first filter plate may contact the punched plate of the first filter plate and the dual wall of the second filter plate.

In discharging the cooling water, the cooling water contacting the punched surface of the first filter plate may be filtered to be discharged to the outlet side, the cooling water contacting the dual wall of the second filter plate may be filtered in a discharge cam of the second filter plate to be discharged to the outlet side, the cooling water contacting the curved sections convex toward the inlet side may be filtered in the discharge pocket to be discharged to the outlet side, and the cooling water contacting the bent surface of the second filter plate may be filtered in the discharge cam to be discharged to the outlet side.

According to a strainer wall structure of the present invention, it is possible to provide a substantially larger effective filtering area in the same length and width. Therefore, a flow resistance of settlings and foreign substances covering a suction surface can be substantially reduced. In addition, a pressure drop generated along the strainer wall structure can be reduced depending on reduction in flow resistance.

Further, since the strainer wall structure of the present invention is fabricated by assembling a first filter plate and a second filter plate, which are formed of a punched plate, an upper plate, a lower plate and closed surfaces, without welding, it is possible to easily perform maintenance and installation thereof.

Furthermore, since a plurality of first filter plates having curved sections convex in opposite directions and second filter plates having a dual wall structure are coupled to each other, a load pressure can be distributed to increase structural integrity.

In addition, it is possible to provide the strainer wall structure having a relatively simple structure and capable of simultaneously and economically producing a plurality of first filter plates through one process, and increasing an effective filtering area per unit time.

BRIEF DESCRIPTION OF DRAWINGS

The above and other aspects and advantages of the present invention will become apparent and more readily appreciated from the following description of exemplary embodiments, taken in conjunction with the accompanying drawings of which.

DETAILED DESCRIPTION

Figure 1:
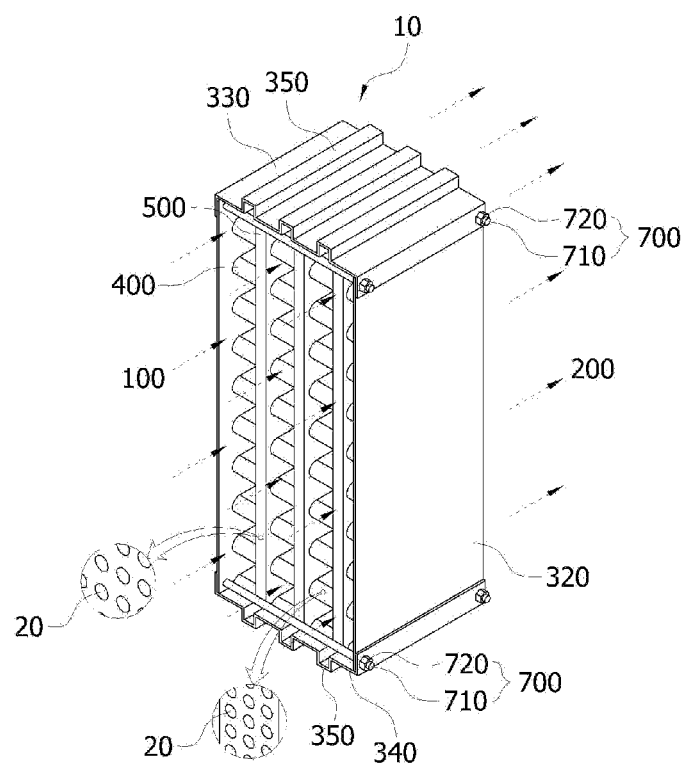
FIG. 1 is a perspective view of a strainer wall structure in accordance with an exemplary embodiment of the present invention.

Various embodiments will now be described more fully with reference to the accompanying drawings in which some embodiments are shown. These inventive concepts may, however, be embodied in different forms and should not be construed as limited to the embodiments set forth herein. Rather, these embodiments are provided so that this disclosure is thorough and complete and fully conveys the inventive concept to those skilled in the art.

In the drawings, like reference numerals designate like elements throughout the invention.

Constitution and Structure of Strainer Wall Structure

Hereinafter, a constitution and structure of a strainer wall structure 10 in accordance with an exemplary embodiment of the present invention will be described.

Figure 2:
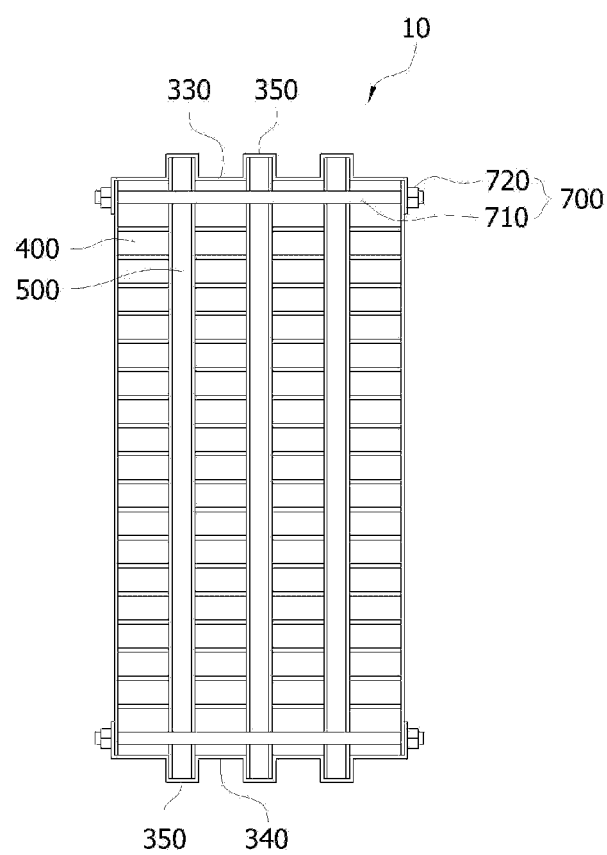
FIG. 2 is a front view of the strainer wall structure in accordance with an exemplary embodiment of the present invention.
Figure 3:
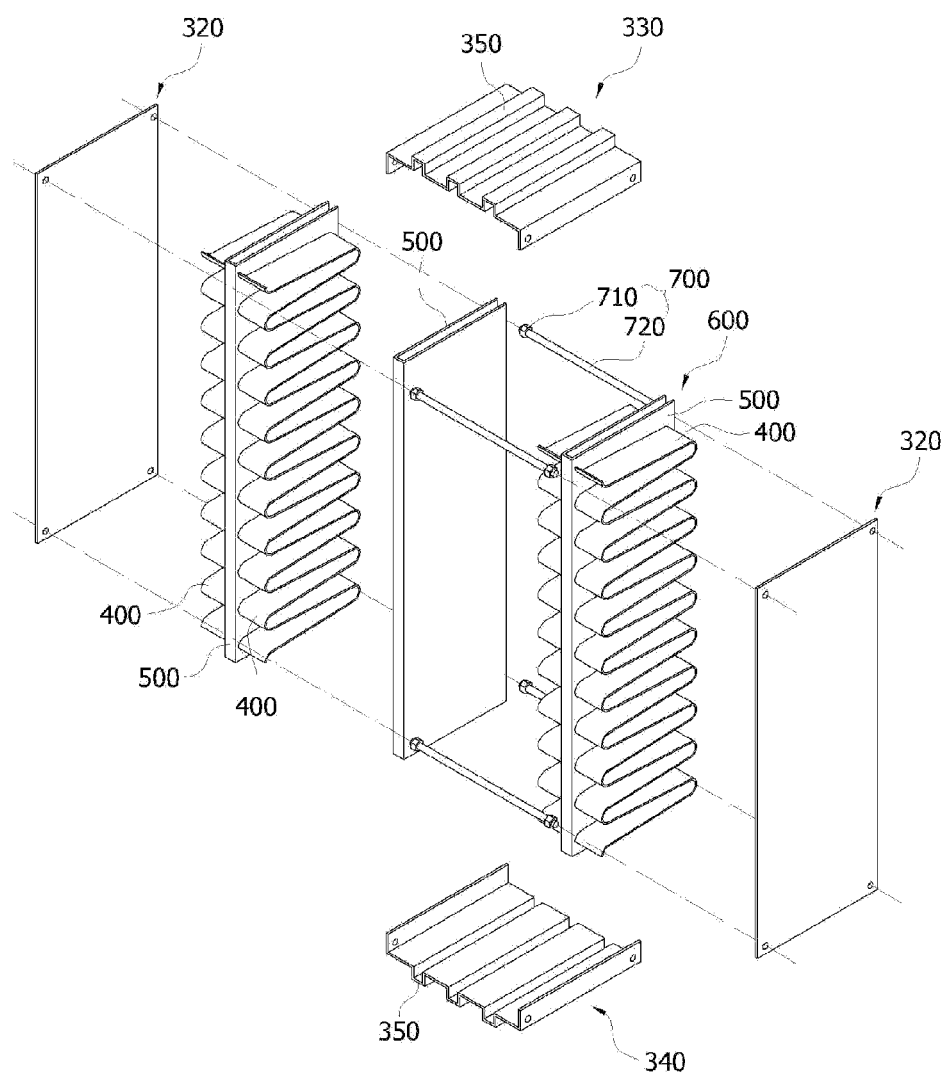
FIG. 3 is an exploded perspective view of the strainer wall structure in accordance with an exemplary embodiment of the present invention.

FIG. 1 is a perspective view of a strainer wall structure in accordance with an exemplary embodiment of the present invention, FIG. 2 is a front view of the strainer wall structure in accordance with an exemplary embodiment of the present invention, and FIG. 3 is an exploded perspective view of the strainer wall structure in accordance with an exemplary embodiment of the present invention.

The strainer wall structure 10 in accordance with an exemplary embodiment of the present invention is installed at a passage through which cooling water flows.

As shown in FIGS. 1 to 3, the strainer wall structure 10 in accordance with an exemplary embodiment of the present invention includes a body having an inlet side 100 through which cooling water is introduced, an outlet side 200 through which the cooling water is filtered and discharged, closed surfaces 320 coupled to side surfaces, an upper plate 330 disposed at an upper side, and a lower plate 340 disposed at a lower side.

In addition, the body includes a first filter plate 400 and a second filter plate 500 disposed therein.

The upper plate 330 includes projections 350 projecting upward therefrom. The projections 350 have a width equal to a width of the second filter plate 500. In addition, the number of projections 350 formed on the upper plate 330 is equal to the number of the second filter plates 500. Therefore, the upper plate 330 has a structure to be press-fitted to the second filter plate 500 of a strainer filtering apparatus 600.

The lower plate 340 also has the same structure as the upper plate 330 to be press-fitted to the second filter plate 500.

In addition, coupling members 700 couple the upper plate 330 to the closed surfaces 320 installed at the side surfaces, and couple the lower plate 340 to the closed surfaces 320. In the specific embodiment, the coupling members 700 may include fixing pins 710 having threads formed at both ends, and fastening members 720 such as nuts, etc.

Figure 4:
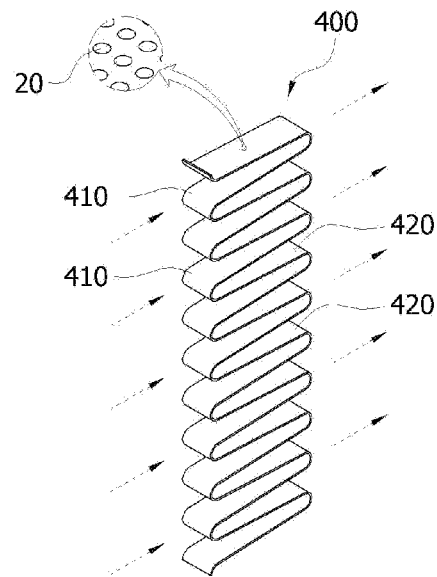
FIG. 4 is an exploded perspective view of a first filter plate in accordance with an exemplary embodiment of the present invention.
Figure 5:
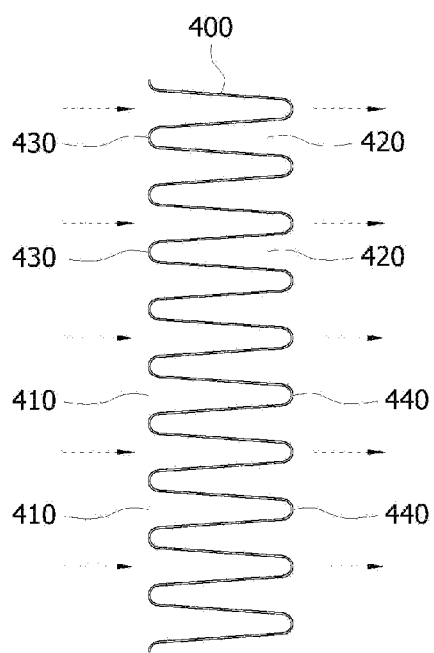
FIG. 5 is a side view of the first filter plate in accordance with an exemplary embodiment of the present invention.

FIG. 4 is an exploded perspective view of a first filter plate in accordance with an exemplary embodiment of the present invention, and FIG. 5 is a side view of the first filter plate in accordance with an exemplary embodiment of the present invention.

The first filter plate 400 is formed by curvedly bending a first punched plate having a plurality of filtering holes 20. Specifically, the first filter plate 400 is formed by alternately and curvedly bending the first punched plate having a predetermined width (in this embodiment, 80 mm) at predetermined intervals (in this embodiment, 300 mm).

The filtering holes 20 formed in the first filtering plate 400 have a diameter of about 1 to 3 mm, preferably, 2 to 2.5 mm (in this embodiment, 2.5 mm). As shown in FIG. 5, the first filter plate 400 is alternately bent in a zigzag shape at predetermined intervals to form a plurality of curved sections 430 and 440. Arrows shown in FIGS. 4 and 5 represent a flow direction of cooling water.

The first filter plate 400 may include curved sections 430 convex in an inlet direction and curved sections 440 convex in an outlet direction, which are opposite to each other.

Cooling water introduced into the inlet side 100 enters an introduction space 410 to be filtered, and then, discharged to the outlet side 200.

Next, the cooling water contacting the curved sections 430 convex toward the inlet side 100 is filtered by the first filter plate 400 to be introduced into a discharge space 420 and then discharged to the outlet side 200. That is, the introduction spaces 410 and the discharge spaces 420 are alternately disposed.

Figure 6:
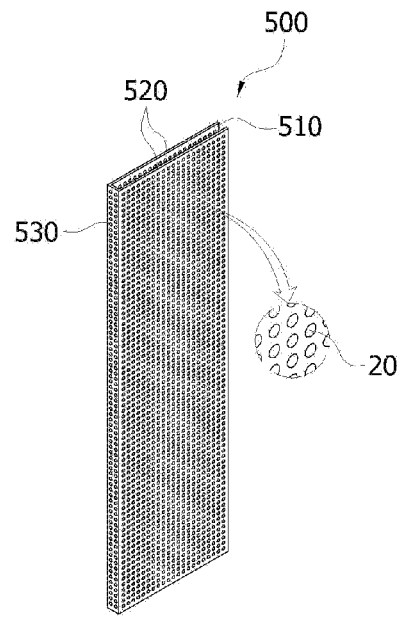
FIG. 6 is a perspective view of a second filter plate in accordance with an exemplary embodiment of the present invention.

FIG. 6 is a perspective view of a second filter plate in accordance with an exemplary embodiment of the present invention.

As shown in FIG. 6, a second punched plate having a predetermined width (in this embodiment, 680 mm) and a predetermined height (in this embodiment, 1060 mm) and including a plurality of filtering holes 20 is bent in a two-stage manner to form a bent surface 530 and a dual wall 520. That is, the second filter plate 500 has a dual wall 520 structure.

The cooling water contacts the bent surface 530 of the second filter plate 500 to be filtered by the filtering holes 20, introduced into a discharge cam 510, and then, discharged to the outlet side 200. The filtering holes 20 formed in the second filter plate 500 have a diameter of about 1 to 3 mm, preferably, 2 to 2.5 mm (in this embodiment, 2.5 mm).

Figure 7:
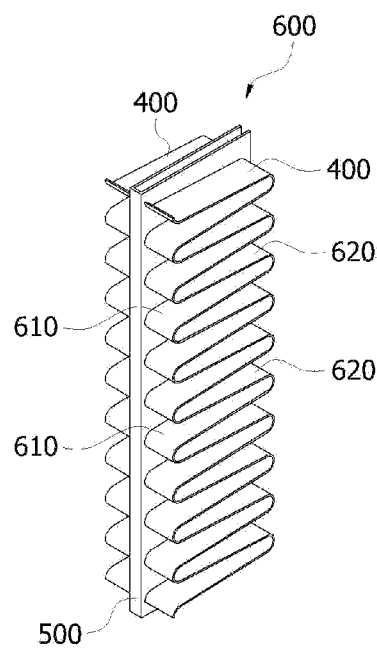
FIG. 7 is a perspective view of a strainer filtering apparatus, to which two first filter plates and one second filter plate are coupled, in accordance with an exemplary embodiment of the present invention.

FIG. 7 is a perspective view of a strainer filtering apparatus, to which two first filter plates and one second filter plate are coupled, in accordance with an exemplary embodiment of the present invention.

As shown in FIG. 7, the first filter plates 400 are coupled to side surfaces of the dual wall 520 of the second filter plate 500. The first filter plates 400 and the second filter plate 500 are coupled by welding, bonding, press-fitting, or the like.

It will be appreciated that in the structure, in which the first filter plates 400 and the second filter plate 500 are coupled to each other, suction pockets 610 into which cooling water is introduced and discharge pockets 620 through which the filtered cooling water is discharged are alternately disposed at both sides of the second filter plate 500. The suction pockets 610 are surrounded by the introduction spaces 410 of the first filter plates 400 and the dual wall 520 of the second filter plate 500.

As shown in FIGS. 1 and 3, the strainer filtering apparatus 600 to which the first filter plates 400 and the second filter plate 500 are coupled is inserted into the body. The number of the first filter plates 400 and the second filter plates 500 constituting the strainer filtering apparatus 600 is not limited. However, when the number of the first filter plates 400 of the strainer filtering apparatus 600 is n, the number of the second filter plates 500 is n−1.

As shown in FIG. 1, in this embodiment, four first filter plates 400 and three second filter plates 500 are provided. The strainer wall structure 10 includes the suction pockets 610 into which cooling water is introduced and the discharge pockets through which the filtered cooling water is discharged, which are alternately disposed. As shown in FIGS. 1 and 7, the suction pockets 610 are surrounded by the introduction spaces 410 of the first filter plates 400 and the dual walls 520 of the second filter plates 500 to form a structure in which the introduced cooling water contacts five surfaces. In addition, the discharge pockets 620 has a structure surrounded by the discharge spaces 420 of the first filter plates 400 and the dual walls 520 of the second filter plates 500.

Method of Manufacturing Strainer Wall Structure

Figure 8:
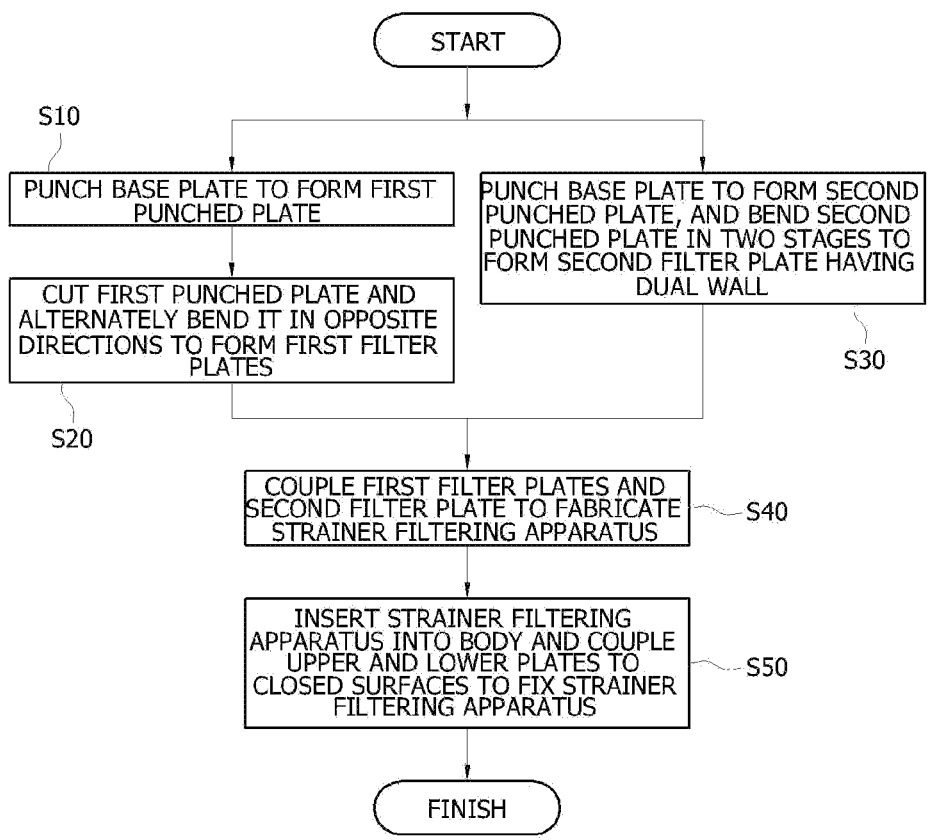
FIG. 8 is a flowchart showing a method of manufacturing a strainer wall structure in accordance with an exemplary embodiment of the present invention.

Hereinafter, a method of manufacturing a strainer wall structure 10 in accordance with an exemplary embodiment of the present invention will be described. FIG. 8 is a flowchart showing a method of manufacturing a strainer wall structure in accordance with an exemplary embodiment of the present invention.

A base plate (in this embodiment, having a thickness of 3.2 mm) is punched using a laser beam, a drill, etc., to fabricate a first punched plate having a plurality of filtering holes 20 (having a diameter of about 2 to 2.5 mm) (S10). The first punched plate is cut at predetermined intervals to fabricate a plurality of first punched plates having a predetermined width (in this embodiment, 80 mm) and a predetermined length larger than the width.

Next, the first punched plate is alternately bent in a zigzag shape at predetermined intervals (in this embodiment, 300 mm) to form a first filter plate 400 having a plurality of curved sections 430 and 440 (S20). As described above, the fabricated first filter plate 400 has curved sections 430 convex toward an inlet side 100 and curved sections 440 convex toward an outlet side 200. In addition, introduction spaces 410 into which cooling water is introduced and discharge spaces 420 through which the cooling water is discharged are alternately disposed.

Further, a base plate having the same height as the formed first filter plate 400 is prepared, and the base plate is punched to fabricate a second punched plate having a plurality of filtering holes 20 (having a diameter of about 2 to 2.5 mm). The second punched plate is bent in a two-stage shape to form a second filter plate 500 having a dual wall 520 and a bent surface 530 (S30).

Next, the second filter plates 500 and the first filter plates 400 are coupled to each other to fabricate a strainer filtering apparatus 600 by bonding, welding or press-fitting (S40). The strainer filtering apparatus 600 includes the first filter plates 400 and the second filter plates 500 alternately coupled to each other. The fabricated strainer filtering apparatus 600 is inserted into a body to complete a strainer wall structure 10 in accordance with an exemplary embodiment of the present invention.

The body includes closed surfaces 320 disposed at side surfaces, an upper plate 330 and a lower plate 340, which are assembled to each other. Specifically, the upper plate 330 includes projections 350 to be press-fitted to upper ends of the second filter plates 500 of the strainer filtering apparatus 600 and coupled to an upper part of the body. In addition, the lower plate 340 also includes projections 350 to be press-fitted to lower ends of the second filter plates 500 of the strainer filtering apparatus 600 and coupled to a lower end of the body.

Therefore, the projections 350 have the same width as the second plates 500, and the number of the projections 350 formed at the upper end and the lower end is the same as the number of the second filter plates 500 installed in the strainer filtering apparatus 600.

Next, the closed surfaces 320 are coupled to both side surfaces of the body. The closed surfaces coupled to both side surfaces are coupled to the upper plate 330 and the lower plate 340 by coupling members 700. As the closed surfaces 320 are coupled to the upper plate 330 and the lower plate 340 by the coupling members 700, the strainer filtering apparatus 600 is fixed into the body (S50). That is, fixing pins 710 having threads formed at both ends are inserted into fixing holes formed at one sides of the closed surfaces 320 and one sides of the upper plates 330, and coupled by fastening members 720 such as nuts, etc. In addition, the fixing pins 710 are inserted into fixing holes formed at one sides of the closed surfaces 320 and one sides of the lower plate 340 to be coupled by fastening members 720.

<Cooling Water Filtering Method using Strainer Wall Structure>

Figure 9:
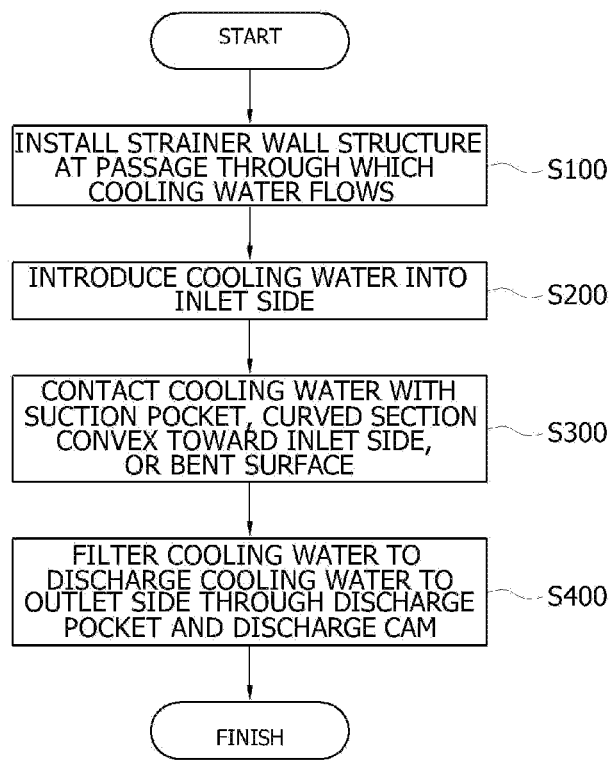
FIG. 9 is a flowchart showing a filtering method using a strainer wall structure in accordance with an exemplary embodiment of the present invention.

Hereinafter, a cooling water filtering method using a strainer wall structure 10 in accordance with an exemplary embodiment of the present invention will be described. FIG. 9 is a flowchart showing a filtering method using a strainer wall structure in accordance with an exemplary embodiment of the present invention.

First, the strainer wall structure 10 having the above constitution and fabricated through the method as described above is installed at a passage through which cooling water flows (S100).

The cooling water is introduced from an inlet side 100 into the strainer wall structure 10 in accordance with an exemplary embodiment of the present invention (S200).

Next, the introduced cooling water is introduced in to suction pockets 610 of the strainer filtering apparatus 600. The suction pockets 610 are surrounded by introduction spaces 410 of first filter plates 400 and a dual wall 520 of second filter plates 500. The cooling water introduced into the suction pockets 610 contacts five surfaces (S300).

Next, the cooling water is filtered by the punched surfaces of the first filter plates 400 to be discharged to an outlet side 200. Or, the cooling water may be filtered by the dual walls 520 of the second filter plates 500 installed at side surfaces of the suction pockets 610 to be introduced into discharge cams 510 of the second filter plates 500 to be discharged (S400).

Otherwise, the cooling water introduced into the inlet side 100 contacts curved sections 430 convex toward the inlet side of the first filter plate 400. The cooling water contacting the curved sections 430 convex toward the inlet side is filtered by the punched surfaces to be introduced into the discharge spaces 420 and discharged to the outlet side 200.

Otherwise, the cooling water introduced into the inlet side 100 contacts the bent surface 530 of the second filter plate 500. The cooling water contacting the bent surface 530 of the second filter plate 500 is filtered by the filtering holes 20 to be introduced into the discharge cam 510 of the second filter plate 500 and discharged to the outlet side.

The foregoing description concerns an exemplary embodiment of the invention, is intended to be illustrative, and should not be construed as limiting the invention. The present teachings can be readily applied to other types of devices and apparatus. Many alternatives, modifications, and variations within the scope and spirit of the present invention will be apparent to those skilled in the art.

The invention claimed is:

1. A strainer wall structure comprising:
an inlet side through which cooling water is introduced and an outlet side through which the cooling water, after filtering, is discharged;
a body having openings in directions of the inlet side and the outlet side, and including closed surfaces disposed at side surfaces, an upper plate assembled to an upper part, and a lower plate assembled to a lower part;
a plurality of first filter plates inserted into the body and including a plurality of curved sections of a first punched plate, wherein
some of the curved sections are convex toward the inlet side,
some of the curved sections are convex toward the outlet side, the curved sections are alternately bent, in a zigzag shape, in opposite directions at a predetermined interval, the curved sections include introduction spaces into which the cooling water is introduced and discharging spaces through which the cooling water is discharged, and the introduction and discharging spaces are alternately disposed;

a plurality of second filter plates coupled between the first filter plates and comprising a second punched plate having a plurality of filtering holes in a two-stage shape, wherein the upper plate includes projections arrayed at a predetermined interval and press-fitted to upper ends of the second filter plates and assembled to an upper part, and the lower plate includes projections arrayed at a predetermined interval and press-fitted to lower ends of the second filter plates and assembled to a lower part; and coupling members coupling the upper plate and the lower plate to the closed surfaces, fixing the first filter plates and the second filter plates in and to the body.

2. The strainer wall structure according to claim 1, wherein a space surrounded by the first filter plates and the second filter plates defines a suction pocket into which the cooling water is introduced and a discharge pocket through which the cooling water is discharged.

3. The strainer wall structure according to claim 1, wherein the second filter plates have a dual wall structure defining a discharge cam therein.

4. The strainer wall structure according to claim 2, wherein, when the cooling water is suctioned into the suction pocket, the cooling water is surrounded by five surfaces.

5. The strainer wall structure according to claim 1, wherein the filtering holes have a diameter of 1 to 3 mm.

* * * * *